UNITED STATES PATENT OFFICE.

CLAUS DIEHL, OF DARMSTADT, GERMANY, ASSIGNOR TO E. MERCK, OF DARMSTADT, GERMANY, A COPARTNERSHIP.

COMPOUNDS OF QUININ AND DIALKYLBARBITURIC ACIDS.

1,185,637. Specification of Letters Patent. Patented June 6, 1916.

No Drawing. Application filed September 13, 1912. Serial No. 720,176.

*To all whom it may concern:*

Be it known that I, Dr. CLAUS DIEHL, a subject of the King of Bavaria, and a resident of Darmstadt, in the Grand Duchy of Hesse, German Empire, have invented certain new and useful Improvements in Compounds of Quinin and Dialkylbarbituric Acids, of which the following is a specification.

My invention relates broadly to new and useful compounds of quinin with dialkylbarbituric acids, and methods of producing the same, and more specifically to combinations of quinin with diethylbarbituric acid and the homologous dialkylbarbituric acids, for instance, dipropylbarbituric acid.

I have discovered, after painstaking experiments, that, contrary to previous experiments and knowledge, it is possible to produce well crystallized and sharply defined chemical compounds of quinin and the dialkylbarbituric acids, and that the therapeutic action of the new class of bodies in no way represents simply the sum of the actions of both components, but instead there is an intensified action, and one which is modified in a favorable manner.

The invention also contemplates combinations of salts of quinin with dialkylbarbituric acids in producing the new product.

The new combinations are obtained through the interaction of the molecular quantities of the free compounds, or their salts, effectively in the presence of proper solvents.

I will now give certain examples of procedure my means of which the new substances or compounds may be produced.

Example 1: I take 65 grams of quinin and a proportional quantity of dialkylbarbituric acid, in this instance 37 gr. diethylbarbituric acid being used, and boil the two components together for some time in approximately 400 c. c. of chloroform. I have found that when the ingredients are in the above proportion, and the proportional amount of solvent used is as stated, that boiling for half an hour will cause the desired reaction to take place. This reaction I believe to be as follows.

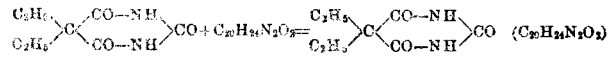

By the boiling the chloroform is evaporated and, upon such evaporation, a residue is produced solidified in the form of crystals, as quinin-diethylbarbituric acid. The yield is quantitative.

Example 2: The same quantities of quinin and diethylbarbituric acid as stated in example 1; that is, in molecular proportion are melted together for a short time, say for a half hour. By the melting the quinin-diethylbarbituric acid is produced. The resulting glassy product of the reaction is then rubbed up with alcohol, ether or acetone. Thereby it is transformed into the colorless crystalline mass from which the new compound, that is, quinin-diethylbarbiturate may be separated in any suitable manner.

Example 3: Aqueous solutions of a salt of quinin, for instance, of 19.8 grams of quinin hydrochlorid, and a salt of dialkylbarbituric acid for instance of 10.3 grams sodium diethylbarbiturate, are combined and the mixture is boiled for a considerable time say for two hours. The precipitate which is separated on mixing the two components gradually goes into solution and after cooling quinin diethylbarbituric acid crystallizes out as drusy crystalline conglomeration. The reaction which takes place in this example is as follows.

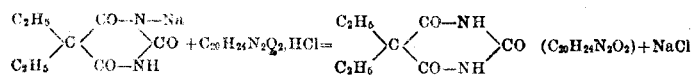

The proportions given in this third example are for the salt referred to therein and, of course, may vary with other salts of quinin and diethylbarbituric acid or dialkylbarbituric acids which may be employed.

The new compound has the characteristics of being formed in clear crystals and being easily soluble in hot alcohol, chloroform, acetone and ethylacetate, a little less soluble in hot water, ether and cold benzol, and difficultly soluble in cold water, or ligroin, and almost insoluble in petroleum ether. The new substance, quinin-diethylbarbituric acid, according to the above examples of procedure, crystallizes out as a drusy conglomeration of acidular crystals. Its melting point is 136° C. It consists of one molecule each of quinin and diethylbarbituric acid, the formula of the compound produced by the above examples being probably, and I believe it to be

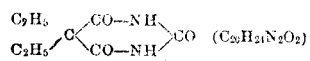

As above stated, in place of diethylbarbituric acid, I may also employ other dialkylbarbituric acids; that is, the homologous dialkylbarbituric acids, such as dipropylbarbituric acid, the method of procedure in the production of the new substance being the same, or substantially the same, as set forth in the above examples.

All of the compounds of quinin with dialkylbarbituric acids are easily split up, by treatment with dilute hydrochloric acid to form a quinin salt, i. e., quinin hydrochlorid, and free dialkylbarbituric acid. When treated with an alkali, for instance, soda lye, the said compounds are decomposed into free quinin and the alkali salt of dialkylbarbituric acid, the latter when soda lye is used, being sodium dialkylbarbiturate. These decomposition reactions are characteristic for all compounds of dialkylbarbituric acids with quinin.

Applying the above tests to the compound of diethylbarbituric acid with quinin, the compound when treated with dilute hydrochloric acid would split up into quinin hydrochlorid and free diethylbarbituric acid, and upon treatment with soda lye, the free quinin base and sodium diethylbarbiturate are formed.

In certain of the accompanying claims, I employ the expression "a quinin compound" in a generic sense to include both the free base quinin and also its salts. Similarly the expressions "a compound comprising a dialkylbarbituric acid radical" and "a compound comprising a diethylbarbituric acid radical" are employed generically to include the free acids specified and their salts.

What I claim and desire to secure by Letters Patent is:

1. As a new article of manufacture, a compound of quinin, and a dialkylbarbituric acid and having the probable formula

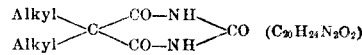

and which upon treatment with dilute hydrochloric acid splits up into quinin hydrochlorid and free dialkylbarbituric acid.

2. As a new article of manufacture, a combination of quinin and diethylbarbituric acid having the probable formula

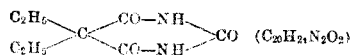

and which upon treatment with dilute hydrochloric acid splits up into quinin hydrochlorid and free diethylbarbituric acid.

3. The method of producing compounds of quinin and a dialkylbarbituric acid which consists in causing a quinin compound and a compound comprising a dialkylbarbituric acid radical to react in the presence of solvents.

4. The method of producing compounds of quinin and a dialkylbarbituric acid which consists in causing a quinin compound and a compound comprising a dialkylbarbituric acid radical to react under the influence of heat.

5. The method of producing compounds of quinin and a dialkylbarbituric acid which consists in causing a quinin compound and a compound comprising a dialkylbarbituric acid radical to react in the presence of solvents and under the influence of heat.

6. The method of producing compounds of quinin and a dialkylbarbituric acid which consists in causing aqueous solutions of a quinin compound and a compound comprising a dialkylbarbituric acid radical to react under the influence of heat.

7. The method of producing compounds of quinin and a dialkylbarbituric acid which consists in heating a quinin compound and a compound comprising a dialkylbarbituric acid radical in a solvent until the same react, and evaporating the solvent until the residue solidifies in crystalline form.

8. The method of producing compounds of quinin and a dialkylbarbituric acid which consists in boiling a salt of quinin and a salt of a dialkylbarbituric acid in a solvent until the same react and separating the quinin-dialkylbarbiturate after cooling.

9. The method of producing quinin-diethylbarbiturate which consists in boiling together a quinin compound and a diethylbarbituric acid compound until they react and separating the quinin-diethylbarbiturate by cooling.

10. The method of producing quinin-diethylbarbiturate which consists in boiling together a salt of quinin and a salt of diethylbarbituric acid in a suitable solvent until the same react and separating the quinin-diethylbarbiturate after cooling.

11. As a new article of manufacture, a well defined crystalline compound of quinin and a dialkylbarbituric acid, resulting from the combination of quinin and a dialkylbarbituric acid in molecular proportions, said compound upon treatment with dilute hydrochloric acid splitting up into quinin hydrochlorid and free dialkylbarbituric acid.

12. As a new article of manufacture, a well defined crystalline compound of quinin and diethylbarbituric acid in molecular proportions, said compound upon treatment with dilute hydrochloric acid splitting up into quinin hydrochlorid and free diethylbarbituric acid.

In testimony whereof I have hereunto signed my name in the presence of two subscribing witnesses.

CLAUS DIEHL.

Witnesses:
 JEAN GRUND,
 CARL GRUND.